United States Patent [19]
DuVall et al.

[11] Patent Number: 5,294,950
[45] Date of Patent: Mar. 15, 1994

[54] IDENTIFICATION SYSTEM FOR AUTOMATED FILM AND ORDER PROCESSING INCLUDING MACHINE AND HUMAN READABLE CODE

[75] Inventors: Dale R. DuVall, Keller, Tex.; Jerry W. Lindenfelser, Brooklyn Park, Minn.; Larry D. McClelland, New Hope, Minn.; Patrick J. Gilligan, Bloomington, Minn.; Roger M. Johnson, Brooklyn Center, Minn.; Charles Swanson, Woodbury, Minn.

[73] Assignee: Photo Control Corporation, Minneapolis, Minn.

[21] Appl. No.: 851,734

[22] Filed: Mar. 16, 1992

[51] Int. Cl.⁵ .............................................. G03B 17/24
[52] U.S. Cl. ........................................ 354/109; 355/40
[58] Field of Search ................ 354/21, 105, 106, 109; 355/55, 56, 57, 40, 41

[56] References Cited
U.S. PATENT DOCUMENTS 5,160,952 11/1992 Iwashita et al. ................ 354/105 X Primary Examiner—Michael L. Gellner
Assistant Examiner—Howard B. Blankenship
Attorney, Agent, or Firm—Merchant, Gould, Smith, Edell, Welter & Schmidt

[57] ABSTRACT

An automated film encoding and decoding system for bringing photographic film from the state of exposure to subject matter through all of the processes required to produce finished photos and package the same. The system includes an encoder coordinately operative with a camera for the placement of a human and machine readable code on the film the decoder capable of reading the code for the control of production-processing equipment in laboratories provided with such equipment. The human readability of the code accommodates production-processing of the film by attendant personnel and also allows for quality control check of automated production-processing equipment. The encoding includes film frame identification information, subject matter information and registration mark information all of which may be utilized on a single exposure situation.

14 Claims, 3 Drawing Sheets

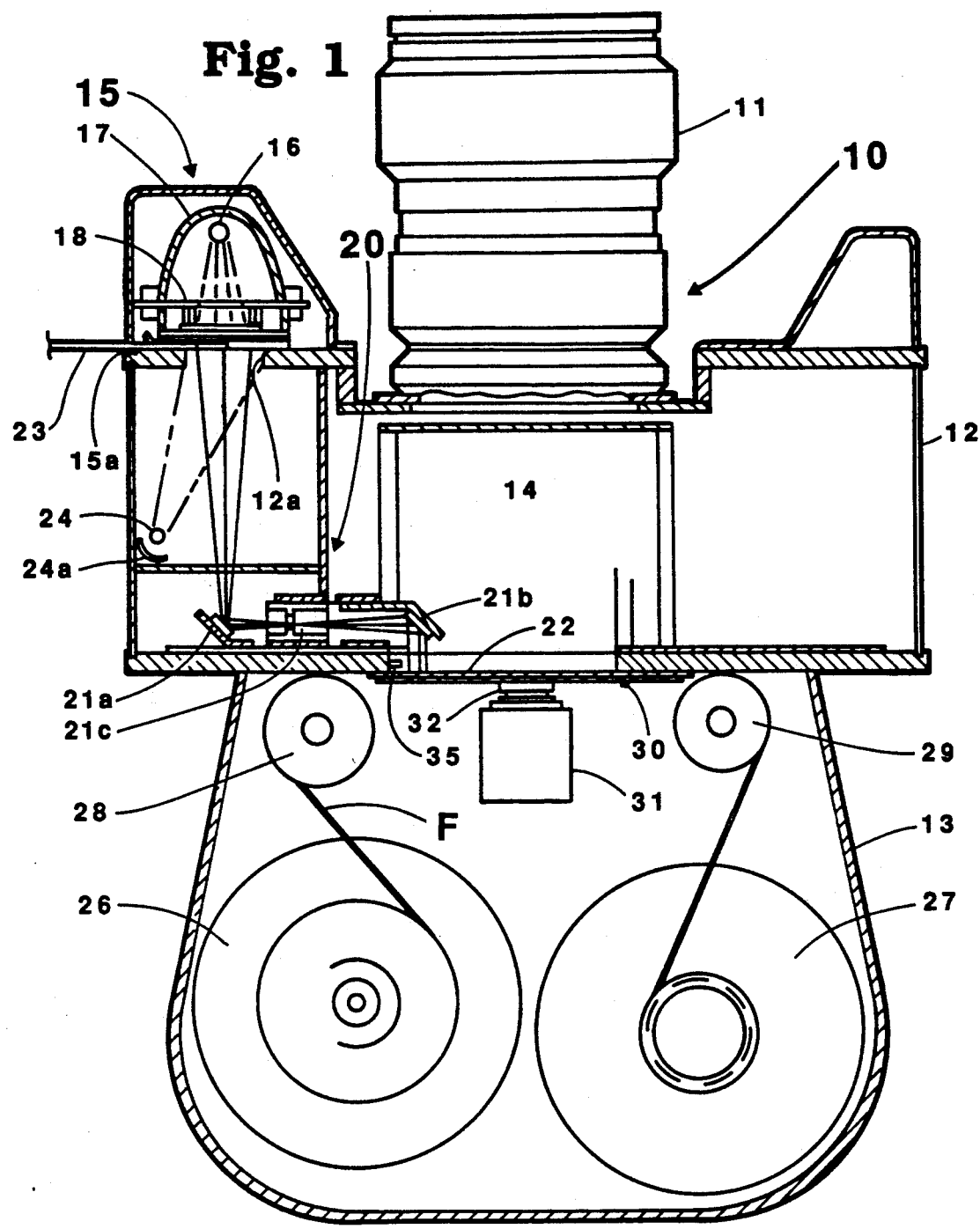
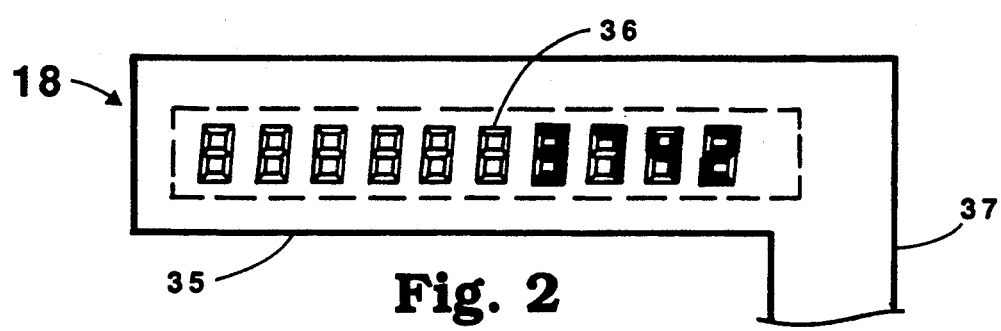

5,294,950

IDENTIFICATION SYSTEM FOR AUTOMATED FILM AND ORDER PROCESSING INCLUDING MACHINE AND HUMAN READABLE CODE

RELATED APPLICATIONS

There are no applications currently on file in the United States Patent Office by applicants or assignee which are related to this application.

FEDERAL SPONSORSHIP

This invention is not made under any Federally sponsored research or development arrangement nor under any other independently sponsored research and development arrangement.

FIELD OF THE INVENTION

This invention relates generally to the field of an automated film coding and encoding, film frame identification system for photographic film for complete control thereof through the various laboratory production steps of processing, editing, printing, cutting and packaging and more specifically to the application of a human and machine readable code to the film at the instant of exposing the film to a selected subject which allows for such control.

SUMMARY OF THE INVENTION

The present invention provides the method of encoding a process control, film frame identification code to photographic film accompanying the exposure of the film to a selected subject with the code utilizing both human and machine recognizable characters and including a unique decoder-scanner capable of reading the applied code. Although applicable to short roll film, it is believed that the invention will have its greatest application to long roll film.

The encoding apparatus for applying the code to the film includes an electronic, selectively controllable, imaging section located within a camera body, a lens-mirror section to transmit the programmed image to the film, and a film magazine with film driving means. The code imaging section includes a liquid crystal, programmable display section arranged for strobe light illumination with the programmed display being transmitted to the film plane and thus the film through the lens-mirror periscope. The strobe light is camera controlled and may be energized previous to, simultaneously or subsequent to the opening of the shutter to capture the subject matter image and the transmitted code in close relation to the image.

In the form illustrated, a ten position format has been selected and utilizing the liquid crystal programmable arrangement, each function is capable of displaying ten numeric characters, 0 through 9, and is equally capable of providing non-confusing letter indicia at each of the ten positions. Therefore, a complete numeric, alphanumeric or complete alpha, human or machine readable code may be provided.

In addition to the specific film frame identification code, the encoding process may include the transmission of human readable subject information with the transmission of such information provided through a second internal illumination source again utilizing the lens-mirror, periscope as provided for the primary code transmission.

The system may, in its most complete form, include the application of a separate photo registration mark or marks which are transmitted to the film with the encoding thereof in a position adjacent or precedent to the transmitted code to trigger operation of the automatic optical scanner-decoding unit. The scanner may be coninually operable but the reading-decoding function is actuated by the registration mark. This inclusion is of particular import when using long roll film where the actual film transfer through the camera body is not perfectly coordinated to frame sizing.

The process includes the steps of exposing the film to a selected subject while exposing the film to the human and machine readable film frame identification code and thereafter reading the code from the film either automatically or humanly to determine the various production processes to which the film should be subjected for proper handling thereof. Such production processes would normally include editing, printing, cutting and packaging. If all the processing equipment within a given lab were provided with such decoding optical scanners, the entire system could be machine controlled but the presence of the human readable code allows for the additional features of human monitoring or human operation at any point in the processing procedure.

BACKGROUND AND OBJECTS OF THE INVENTION

In the evolvement of film processing through the use of automated equipment, various identification, including film frame identification, code systems have been provided for placing a machine readable code onto the film with the exposure of the film to the subject. These code systems have primarily included machine-only readable code arrangements, such as bar, dot or perforate-location codes which do not allow for human interpretaion. Such code systems do not allow for human implementation or monitoring of the production-process systems and therefore are not useable by labratories not equipped with machine readers.

In the field of school photography where a single subject exposure may result in a plurality of uses for the resulting photograph and which may require information related to the use, particularly the identification of the student, a tracking system from exposure to final use is a necessity. In this particular example the student often purchases the photos and he or she selects from various sizes and the system ideally provides a complete processing arrangement including the various school uses and a selected package of photos for purchase.

The code application as provided herein accomodates a processing cross check and allows for automatic or human processing procedures.

The applicants of this invention are aware of various code systems which control film processing procedures but have found no such code systems embodying both human and machine readable codes and a discussion of prior patentable related devices is contained in a separate Prior Art Statement.

It is therefore an object of the present invention to provide an optical encoding/decoding film processing system which includes the procedure of encoding film with a human and machine readable code with the exposure of the film to a selected subject.

It is a further object of the present invention to encode a human readable code on film with the exposure of the film to a selected subject which encoding process sets forth the continuing film processing procedures including editing, printing, cutting and packaging of the developed film.

It is still a further object of the present invention to encode a human readable code onto film wherein the applied code includes a multiple position code arrangement with each position capable of establishing a single numeric or selected alphabetical figure.

It is still a further object of the present invention to encode a human readable code on a photographic film wherein the applied code includes a multiple position code and the code may include a single numeric figure or a non-confusing letter figure allowing human and machine decoding thereof.

It is still a further object of the present invention to provide a human readable film frame code on a photographic film wherein a registration mark is provided in close association to the enscribed code for initiating machine reading-decoder function.

These and other objects and advantages of the present invention will become obvious from a consideration of the accompanying disclosure of a preferred embodiment of the invention made in association with the accompanying drawings.

DESCRIPTION OF THE DRAWINGS

FIG. 1 is a cross sectional view taken through a camera as may be utilized in the practice of the invention, the camera arranged for encoding of film with a human and machine readable code as well as providing personal identification and a frame registration mark on the film for complete laboratory processing of the film;

FIG. 2 is a view of a the human and machine readable identification code illustrating ten figure positions;

DESCRIPTION OF A PREFERRED FORM OF THE INVENTION

Figure 3:
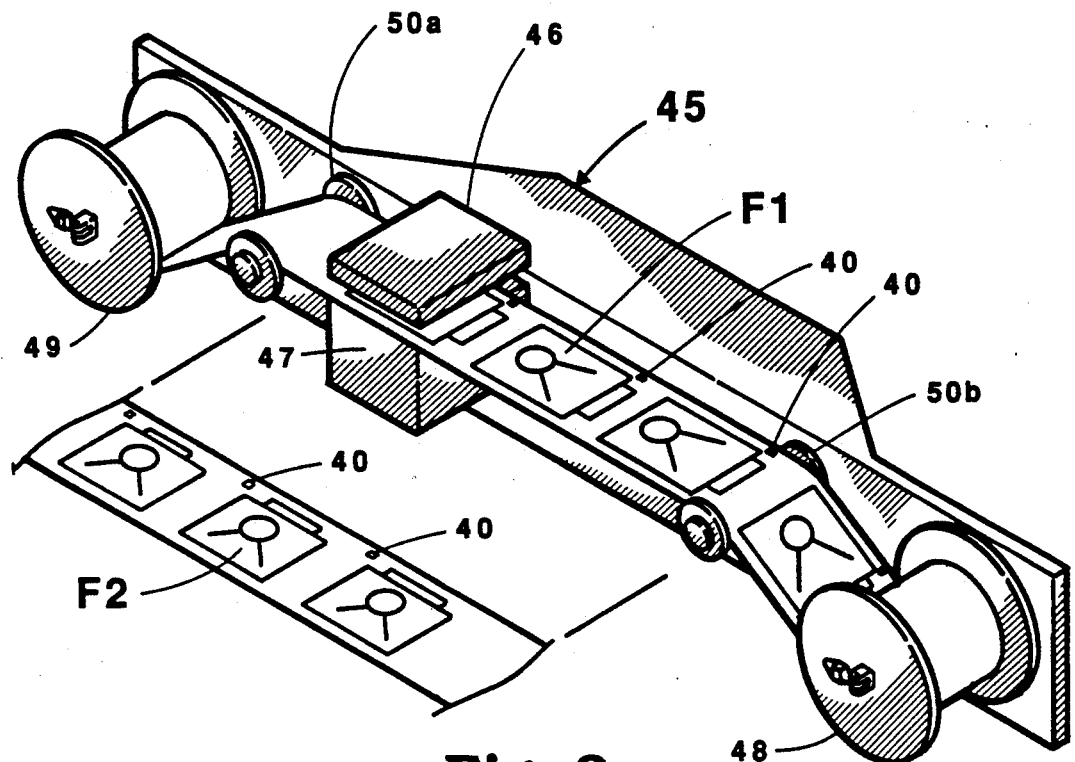
FIG. 3 is a view of the an automatic film transport system including the optical scanner-decoder for reading of the encoded film.

In accordance with the accompanying drawings, a camera unit adapted for the purposes of the invention which include the transfer of a human and machine readable code to photographic film with the exposure of the film to the subject matter for the continuing purposes of complete processing of the film including editing, printing, cutting and packaging is illustrated in the simplified cross sectional view of FIG. 1 and is generally designated 10. The camera unit includes a lens 11, camera body 12 and detachable film magazine 13. The lens 11 includes any standard lens structure and is removably attached to the camera body 12. The film magazine 13 is similarly removably attached to the camera body 12 and, as is known in the art, is normally positionably on the body 12 in the position as shown or at right angles thereto which position allows for what is known to the art as Split Frame spacing.

It should be stated at this time that the particular camera unit 10 discussed and illustrated is usable for three different film widths, these being 35mm, 46mm, 70mm. In addition, the camera unit 10 is usable with a number of different film frames including split formats in which the subject image 51 is arranged transversely of the film rather than in linear fashion.

The camera body 12 includes a mirror-shutter assembly 14 with the only departure from such a conventional camera body being the code and identification generation and transfer structure integral with the body 12 and designated in its entirety 15. As illustrated, such generation and transfer section 15 includes a strobe light source 16 and reflector 17 arranged to illuminate the encode device 18 with the light of the strobe passing through the encode device 18 directed through body aperture 12a and then internally of the body 12 through a periscope arrangement 20 consisting of mirrors 21a, 21b and lens 21c to finally impinge upon and expose the film F located at the film plane 22 of the film magazine 13.

A secondary identification device may be utilized with the illustrated camera body 12 and described transfer structure 15. This secondary identification device may be in the form of a subject identification card 23 insertable into housing 15 through a receiving slot 15a. Front surface illumination of card 23 is provided by a second strobe light source 24 and reflector 24a within the body 12. Light from the front surface of card 23 is again transmitted through the periscope 20 arrangement consisting of mirrors 21a, 21b and lens 21c to the film F.

Obviously, timing of the energization of the strobe lights 16, 24 is coordinated with the lens/shutter function and the second strobe 24 will not be activated unless a card 22 is positioned within the housing slot 15a.

As illustrated in FIG. 1 the film magazine 13 includes a housing positionably receivable upon the camera body 12 and includes the normally provided film transport mechanisms therein. These film transport mechanisms include a supply roll 26, a take up roll 27, a idler roll 28 and a metering roller 29 for transporting the film from supply to takeup. The mechanism for holding the film F against the camera body 12 in image receiving position includes a pressure plate structure 30 and a pressure applying solenoid 31 and spring 32 combination.

The encoding structure 18 includes the LCD arrangement as illustrated in FIG. 2. The particular LCD arrangement illustrated is designed for the specific intentions of the invention and is not commercially available. For the particular purposes of decoding and figure recognition, the characters developed are formed with seven distinct segment increments with each of the increments providing what may be comparatively be stated to be of greater width and shorter longitudinal dimension than a normal segment. The result is a relatively wider and squatter character which increases the recognizability thereof by the decoder-scanner unit. The LCD unit 18, in the form shown, includes the display leg 35 having the preferred ten figure array 36 thereon and each FIG. 36 is formed with, in this preferred form a maximum of seven segments. Obviously an electronic programming device which may include a keyboard (not shown) is utilized to energize the characters of the array 36 to be displayed and transmitted to the film F. As illustrated, the ten position array 36 allows numbers or non-confusing letters to be formed through the LCD unit 18 for their illumination by the strobe light source 16.

As illustrated in FIG. 2, only the display leg portion 35 is illustrated in its entirety with a downwardly depending leg 37 being illustrative of a mounting and electronic conducting portion.

The LCD encoding arrangement as describe and illustrated then provides ten individual figures capable of producing ten individual digits, 0-9, as well as letters which are not confusingle similar to such numbers but both of which are capable of human and machine reading.

In addition to the alpha-numeric encoding available through LCD unit 18 and the identification available through utilization of card 23, applicants have provided for the application of a registration mark to the film for energizing the decoder-scanner device on a limited basis corresponding to that time when such code is within the decoder read area.

As illustrated in FIG. 1, a film exposing element such as an LED 35 is positioned adjacent the aforementioned film plane 22 and thus the film F and is energized, for example, with the energization of the strobe lights 16, 24. The energization of this LED 35 places a registration mark 40 upon the film thus referencing the location of the encoded material and when the film is passed through the scanner-decoder 45, mark 40 will trigger the decoder to begin interpreting and thus decoding of the transmitted and placed processing code for, for example, storage thereof or direct control of operative equipment to continue film operations to final packaging.

The concept of the registration mark 40 is of particular import when using long roll film. Metering of long roll film is not always accurate and the simultaneous placement of this registration mark 40 along with code and subject matter placement eliminates metering discrepancies.

To this point, the applicant has provided both an LCD array and an LED useage. It should be obvious to anyone skilled in the art that the LCD array could be replaced by an LED unit but it is also well known that the electronics required by a comparable LED system would be substantially complex and would require more space than a comparable LCD system. However, the application should not be limited by the preferred description of an LCD or LED arrangement in that the primary aspect of the invention is in the encoding of a human and machine readable code upon the film with the subsequent decoding thereof.

Figure 5:
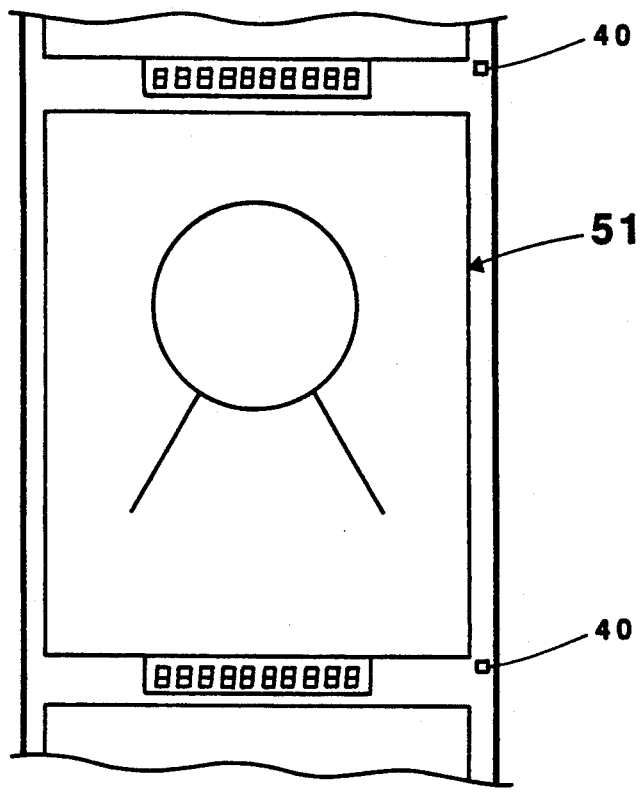
FIG. 5 is an illustration of the process and identification code and the registration mark arranged in conjunction with the subject matter image in a first film format.
Figure 6:
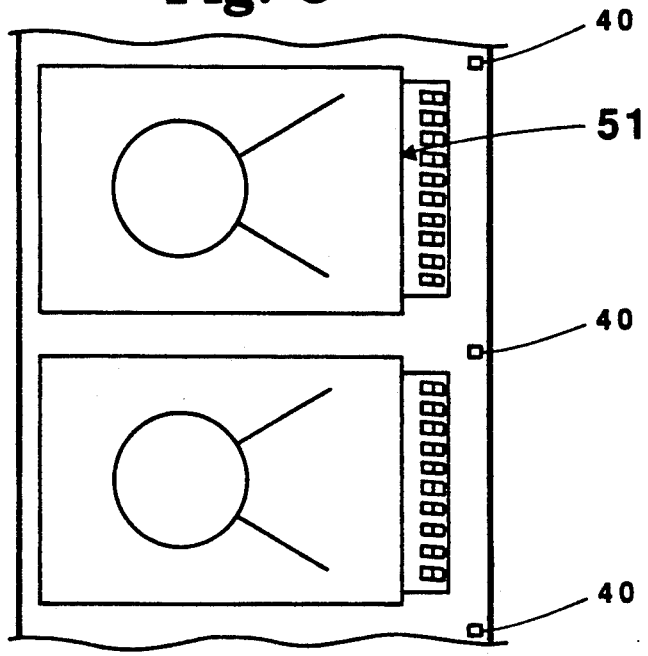
FIG. 6 is an illustration of the process and identification code and the registration mark arranged in conjunction with the subject matter image in a second film format.

FIGS. 5 and 6 illustrate respective positions of the image, encoded processing code, subject matter identification information and the registration marking in two specific film formats. FIG. 5 illustrates such images in a 35MM, 45MM and 70MM format and FIG. 6 illustrates the same in a split format.

In operation the LCD array 18 is loaded with the desired processing data from an electronic programming device and when the camera shutter is triggered, strobe 16 is coordinately triggered. Both images, subject and code, are then, subject directly and code through periscope 20, directed to the film surface. If the subject identification card 22 is utilized, strobe 23 is likewise triggered and the subject information is also transmitted to the film through the periscope 20.

The optical scanner-decoder system is illustrated in FIG. 3 and designated in its entirety 45 with the scanner-decoder including an illuminator 46 and an optical system sensor and processor board 47 located on opposite sides of the film with a supply 48 and take-up 49 roller combination provided to advance the film. The system of FIG. 3 illustrates a long roll, automatic film transport system including the supply roll 48 and the take up roller 49 with intermediate guide rollers 50a, 50b therebetween.

FIG. 3 is a composite illustration of film strips F1, F2 illustrating the subject matter and accompanying encoded material in transverse and longitudinal formats. The registration marks 40 which trigger the scanner-decoder operation are similarly illustrated on the film strips F1, F2.

Obviously, the function of the illuminator 46 and optical sensor and proccessor board 47 is to machine read and decode the encoded information that has been provided to the film through the LCD encoder process. In this manner the numeric, alpha-numeric or alpha code is read.

Figure 4:
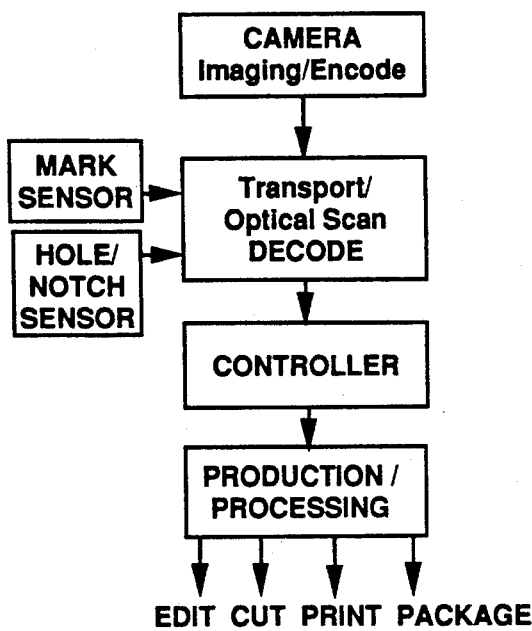
FIG. 4 is a block diagram illustrating one procedure in utilization of the encoded film in controlling the continuing production-processing equipment.

The operational schematic of FIG. 4 illustrates the operational process of the system. The camera/imaging station provides the subject matter exposure and the encoding of material necessary for proper processing and includes the steps of LCD array programming which primarily controls continued processing, subject information and registration mark placement. After total film exposure to subject matter, the film is introduced into the film drive transport for decoding by the optical scanner-decoder. The film drive transport may be controlled by the registration mark sensor or a sensor responsive to other indicia such as a notch or hole sensor. The film transport may be stopped for decoding or may continue its drive function, dependent upon the speed of the optical scanner-decoder. The function of the optical scanner is to obviously decode the encoded information through pattern recognition and through microrocessing techniques the gathered information is transferable to a controller which then has the necessary information to control the continuing production-processing equipment in, for example, the editting, printing, cutting and final packaging of the film and resulting subject matter photos. The information gathered by the optical scanner-decoder may communicate directly with the controller or may store such decoded information for further physical transfer of the same to the production-processing equipment.

The system of FIG. 4 is dependent upon the particular lab facilities and number of automatic production-processing machines in the lab. The important aspect of FIG. 4 is the coding of film by the camera-imaging sector and the decoding thereof through the optical scanner-decoder.

It has been stated that an LCD multi position array is provided. It should be obvious that an LED arrangement may be utilized but the electronics required with an LED system are substantially more complex than that required in an LCD arrangement. The application should not, however, be limited by the preferred description of an LCD arrangement in that the important aspect of the invention lies in the human and machine readable encoding and decoding.

With the concepts of the invention, the presence of the human readable code aspects should be obvious. If a lab is not equipped with equipment capable of reading and utilizing the code, persons will be able to properly process the film through its required production-processing steps. Similarly, quality control by allowing human inspection at any point in an automated process is often desirable.

It should be obvious that the invention includes the uniqueness of encoding with human and machine readable characters as well as the scanner-decoding operation which allows for the continued automatic production-processing of film in accordance with preprogrammed directives.

What is claimed is:

1. A system for automatic film identification and film order processing including:
   a. a camera unit including a lens, a shutter, a camera body and film;
   b. external illumination means for illuminating a photographic subject and for the transfer of a subject image to said film forming exposed film having a subject image thereon;
   c. encoding means for transferring at least a process identification human and machine readable code data to said film, said encoding means including an internal illumination means for providing light for forming exposed film having a data image area located proximate said subject image area, said encoding means further including a periscope to transfer an image of said human and machine readable code data to said film;
   d. decoding means arranged to receive said exposed film for scanning and decoding said data image.

2. The system set forth in claim 1 and said decoding means including an optical scanner-decoder providing an illuminator and an optical sensor signal processor.

3. The system set forth in claim 1 and said code including film frame registration code.

4. The system set forth in claim 3 and said decoding means being responsive to said film frame registration code whereby said decoding means is energized in response to recognition of said registration code.

5. The system set forth in claim 1 and said identification code including a numeric code.

6. The system set forth in claim 1 and said identification code including an alphabetic code.

7. The system set forth in claim 1 and said identification code including an alpha-numeric code in characters which are selected to provide both a machine and human readable code and the alpha characters are selected to be non-confusing to the numeric characters.

8. The system set forth in claim 1 and said code being developed from a plural figure position format, and that each position is selectively capable of establishing the numerals 0 through 9 and alpha figures which are non-confusing with respect to such formed numerals.

9. The system set forth in claim 3 and said registration code and said identification code being simultaneously transferred to the film with actuation of said shutter of said camera.

10. The system set forth in claim 3 and said registration code and said identification code being transferred to the film prior to actuation of said shutter of said camera.

11. The system set forth in claim 3 and said registration code and said identification code being transferred to the film subsequent to actuation of the shutter of said camera.

12. The system as set forth in claim 1 and the identification code including electronic information to control processing equipment for the continued processing of the film including editing, printing, cutting and packaging thereof.

13. The system as set forth in claim 12 and said decoding means providing an optical scanner including:
   a. a light source which projects the film placed identification code information to a sensor;
   b. a sensor identifying and interpreting each film applied human and machine readable figure; and,
   c. said sensor arranged and constructed to control film production-processing equipment in accordance with the interpretation of the identified figures.

14. A camera comprising:
   a camera body (12) defining a film plane (22);
   a lens (11), mounted to said camera body (12);
   a film magazine (13) for transporting film to said film plane (22), said film magazine (13) containing film (F);
   said film (F) and said film plane (22) defining an image area (51);
   registration marking means (35), located proximate said image area (51) for exposing an index mark (40) on said film (F);
   identification generator (15), having an encoder device (18);
   said encoder device (18) for placing an alphanumeric data image on said film;
   a periscope (20) for transferring said data image from said encoder device (18) onto said film (F) adjacent said image area (51);
   whereby said index mark (40) marks the location on said film of said data image.

* * * * *

UNITED STATES PATENT AND TRADEMARK OFFICE
CERTIFICATE OF CORRECTION

PATENT NO. : 5,294,950

DATED : March 15, 1994

INVENTOR(S) : DuVall et al

It is certified that error appears in the above-identified patent and that said Letters Patent is hereby corrected as shown below:

On the cover page, under "[75] Inventors", please delete the name Larry D. McClelland, and insert therefor --Larry D. McClellan--

In column 2, line 7, please delete the word "import" and insert therefor --importance--

In column 2, line 50, please delete the word "accomodates" and insert therefor --accommodates--

In column 3, line 26, please delete the words "cross sectional" and insert therefor --cross-sectional--

In column 3, line 34, please delete the word "the"

In column 3, line 59, please delete the words "cross sectional" and insert therefor --cross-sectional--

In column 4, line 35, please delete "22" and insert therefor --23--

In column 5, line 5, please delete the word "describe" and insert therefor --described--

UNITED STATES PATENT AND TRADEMARK OFFICE
CERTIFICATE OF CORRECTION

PATENT NO. : 5,294,950

DATED : March 15, 1994

INVENTOR(S) : DuVall et al

It is certified that error appears in the above-identified patent and that said Letters Patent is hereby corrected as shown below:

In column 5, line 8, please delete the word "confusingle" and insert therefor --confusingly--

In column 5, line 32, please delete the word "import" and substitute therefor --importance--

In column 5, line 38, please delete the word "useage" and substitute therefor --usage--

In column 5, lines 59 and 60, please delete "subject directly and code through periscope 20"

In column 6, line 36, please delete the word "microrocessing" and substitute therefor --microprocessing--

In column 6, line 39, please delete the word "editting" and substitute therefor --editing--

Signed and Sealed this

Second Day of May, 1995

BRUCE LEHMAN

*Attest:*

*Attesting Officer*

Commissioner of Patents and Trademarks